United States Patent Office 3,268,417
Patented August 23, 1966

3,268,417
TREATMENT AND USE OF ENZYMES FOR THE HYDROLYSIS OF STARCH
John T. Garbutt and Austin M. Hanson, Muscatine, Iowa, assignors to Grain Processing Corporation, Muscatine, Iowa, a corporation of Iowa
No Drawing. Filed Apr. 8, 1964, Ser. No. 358,407
14 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are used most commonly in industry in the enzymatic saccharification of liquefied starch to form dextrose-containing syrups. The culture filtrates of *Aspergillus phoenicis, Aspergillus diastaticus, Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interfere with the production of dextrose when the enzyme preparaion is employed to hydrolyze starch. Thus, for example, in the culture broth of *Aspergillus niger* three predominant enzyme systems have been identified, namely, alpha-amylase, glucamylase (amyloglucosidase) and transglucosidase. Alpha-amylase attacks the whole starch granule and breaks it down into a dispersed colloidal mass. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages. After liquefaction, additional contact of alpha-amylase with these fractions reduces the molecular size appreciably and causes a desirable reduction in viscosity.

In contrast to the multi-chain action of alpha-amylase, the action of glucamylase is thought to be a "single-chain" action where an enzyme molecule attaches to the dextrin before detaching and attacking another dextrin. The action of glucamylase on dextrin polymers is much more specific at the alpha-1,4-glucosidic bonds than the alpha-1,6-glucosidic bonds in that it will cleave the former type bond approximately 30 times as fast as the latter type bond. The glucamylase action thus results in the formation of dextrose.

The presence of transglucosidase with glucamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly, it is highly desirable to separate the desired glucamylase enzyme from other enzymes, principally transglucosidase, present in fungal enzyme preparations which, in the hydrolysis of starch, interfere with the formation of dextrose.

The present invention provides a process for purifying glucamylase containing fungal enzyme preparations to separate therefrom enzymes which, in the hydrolyzation of starchy materials, interfere with the production of dextrose. The present invention also provides a process for hydrolyzing starch to obtain high yields of dextrose by subjecting a liquefied starchy material to the action of a purified glucamylase-containing fungal enzyme preparation from which there has been removed those enzymes which interefere with the production of dextrose.

In accordance with the present invention, a glucamylase-containing fungal enzyme preparation is purified by treatment with a protease under conditions to effectively inactivate the transglucosidase. Treatment of the fungal enzyme preparation with the protease is carried out under conditions which favor protease activity, and after substantially complete inactivation of the transglucosidase the treated preparation is then maintained under conditions favorable to glucamylase activity.

Animal, plant and microbial proteases can be effectively employed to inactivate transglucosidase and suitable proteases from these classes are employed in accordance with the invention. Representative proteases are trypsin, pepsin, pancreatin, papain, fungal proteases, bacterial proteases and the like. The amount of protease required for effective purification varies depending upon the original purity of the fungal enzyme undergoing treatment and the conditions (temperature, pH, time of treatment, etc.) employed for the purification. In general, with relatively pure glucamylase-containing fungal enzyme preparations, the level of protease required ranges from about 0.01 to 2 milligrams of protease per glucamylase unit. With less pure or crude fungal enzyme preparations the protease requirements may be increased.

The process of the invention is carried out by intimately dispersing the protease within the fungal enzyme preparation at a temperature ranging from about 20° C. to about 60° C., preferably 35 to 40° C., and at a pH at which the particular protease is most active. Generally, this will be at a pH ranging from about 6 to about 9, more preferably a pH of about 7 to 8. In the case of a protease such as pepsin, a lower pH can be used since this protease is most active at about pH 2. Agitation of the mixture is effected to insure proper dispersion of the protease throughout the solution being treated. The treatment with the protease is carried out for a period sufficient to achieve substantially complete inactivation of the transglucosidase. The time of treatment may vary widely depending upon the various specific treatment conditions and may range from about 5 minutes up to 10 hours or more. From a practical standpoint, treatment for about one hour is generally satisfactory. After treatment with the protease so as to achieve substantially complete inactivation of transglucosidase, the fungal enzyme preparation is maintained under conditions which favor glucamylase activity. Thus, in most cases, the treated fungal enzyme preparation is maintained at a pH of about 4.

The process of the invention is applicable to the purification of glucamylase-containing fungal enzyme preparations to inactivate transglucosidase which may be present therein. Accordingly, glucamylase-containing culture filtrates of *Aspergillus phoenicis, Aspergillus diastaticus, Aspergillus usamii* and *Aspergillus niger* can be advantageously treated by the process of the invention. The process is applicable to crude glucamylase solutions and to such solutions which have undergone preliminary purification. As would be expected, the protease requirements are generally less when extraneous material has been removed by some means of preliminary purification.

Several procedures can be employed to evaluate the effectiveness of the purification treatment. The ultimate test is, of course, the ability of the treated enzyme preparation to hydrolyze starch to produce hydrolyzates having high dextrose contents such as dextrose equivalents of 94 to 98 and above.

One convenient procedure for evaluating the effectiveness of the protease treatment consists in reacting one milliliter of a 10% maltose solution buffered at pH 4.0 with one milliliter of enzyme solution (previously treated with protease) at 60° C. for 50 minutes. The resulting hydrolyzate is diluted to 7 to 10 milliliters with water and 2 microliters applied to a thin-layer chromatogram made up of diatomaceous earth filter aids (6 parts of medium particle size material having a pH>7, 4 parts of small particle size material having pH<7) and 0.5 part calcium sulfate. After development for one hour in a solution of n-butanol, pyridine and water (75:15:10), the dried plate is sprayed with ammoniacal silver nitrate and heated at 100° C. for 5 to 10 minutes to develop color. The presence of panose and isomaltose (the synthetic products of transglucosidase) indicates the presence of transglucosidase and vice versa. The whole procedure takes less than three hours and is very useful for quickly determining the effects of the treatment with respect to removing or inactivating transglucosidase.

The following specific examples further illustrate the present invention and the advantages thereof.

Example 1

Twenty-five milliliters of a glucamylase solution that had been obtained by reconstituting an ethanol precipitated preparation was heated to a temperature of 40° C. The solution contained 6.9 glucamylase units per milliliter and appreciable transglucosidase as demonstrated by the thin-layer chromatogram technique described above. The pH of the solution was adjusted to 8.1 with sodium hydroxide and 200 milligrams of a commercial pancreatin were added. This amounted to about 1.16 milligrams of pancreatin per glucamylase unit. After 15 minutes the pH of the solution was adjusted to pH 4.2 with acetate buffer at pH 4.0. The glucamylase content of the solution based on the original volume was 6.8 units per milliliter, thus representing a glucamylase recovery of 99%. The transglucosidase had been substantially eliminated.

In order to evaluate the preparations further, the untreated glucamylase preparation and the protease treated preparations were diluted to 2.0 glucamylase units per milliliter and one milliliter was added to 50 grams of enzyme liquefied starch solution containing 24% dry substant at pH 4.3. The flasks were shaken for 70 hours at 60° C. The dextrose equivalent (D.E.) was determined on small aliquots by the sugar determination method described by Somogyi in the Journal of Biological Chemistry 160, 61–68 (1945).

The glucamylase activity of the enzyme preparations was assayed by the procedure described by Kooi et al. in United States Patent 3,042,584, dated July 3, 1962.

The following results were obtained:

TABLE 1.—SACCHARIFICATION OF LIQUEFIED STARCH BY UNTREATED AND PANCREATIN TREATED GLUCAMYLASE PREPARATIONS FROM A. NIGER

| Enzyme: | D.E. at 70 hours |
|---|---|
| Untreated | 92.1 |
| Pancreatin treated | 97.0 |

Example 2

Two 20 milliliter portions of glucamylase that had been obtained by reconstituting a methanol precipitated preparation were attempered to 40° C., the pH was adjusted to 8.1 and 25 and 50 milligrams of commercial pancreatin respectively were added to the solutions. The original solutions contained 7.4 glucamylase units per milliliter. Thus, the pancreatin dosage was 0.169 and 0.338 milligrams of pancreatin per unit of glucamylase, respectively. The solutions were held at 38° to 40° C. for 60 minutes after which they were adjusted to pH 4.2 with calcium chloride and sulfuric acid. Based on the original volume, the solutions after treatment contained 4.5 glucamylase units per milliliter which represents a 61% recovery of glucamylase. There was a trace of transglucosidase at the 0.169 milligram per unit level and none at the 0.338 milligram per unit level. The untreated and purified enzyme solutions were then used to saccharify liquefied starch in the manner indicated in Example 1 with the following results.

TABLE 2.—SACCHARIFICATION OF LIQUEFIED STARCH BY UNTREATED AND PANCREATIN TREATED GLUCAMYLASE PREPARATIONS FROM A. NIGER

| Enzyme: | D.E. at 70 hours |
|---|---|
| Untreated | 89.2 |
| 0.169 mg. pancreatin/unit | 96.3 |
| 0.338 mg. pancreatin/unit | 96.3 |

Example 3

The following table summarizes a number of runs in which various proteases were used to purify glucamylase and transglucosidase containing fungal enzyme preparations.

TABLE 3

| Protease Type | Treatment | | | Glucamylase recovery, Percent | Transglucosidase Remaining [1] |
|---|---|---|---|---|---|
| | Concentration, Percent | pH | Time, Minutes | | |
| Animal: | | | | | |
| Trypsin | 0.4 | 8.1 | 20 | 88 | 0 |
| Pepsin | 1.0 | 2.0 | 30 | Not run | ++ |
| Pancreatin | 0.4 | 8.1 | 40 | 89 | 0 |
| Plant: | | | | | |
| Papain | 1.0 | 7.0 | 30 | Not run | ++ |
| Papain P6 | 0.1 | 8.1 | 50 | 70 | + |
| Ficin F6 | 0.1 | 8.1 | 50 | 75 | +++ |
| Microbial: | | | | | |
| Fungal P-11 | 1.0 | 7.5 | 30 | Not run | + |
| Fungal 41 | 0.1 | 8.1 | 50 | 78 | + |
| Fungal Mycozyme 100 | 0.1 | 8.1 | 50 | 80 | + |
| Fungal 30 | 0.5 | 8.1 | 60 | 79 | 0 |
| Bacterial Protease | 0.1 | 8.1 | 60 | 73 | 0 |
| Bacterial B-6 | 0.5 | 8.1 | 60 | 83 | 0 |
| None | | 8.1 | 60 | 60 to 90 | +++ |
| None | | 4.2 | | 100 | ++++ |

[1] Transglucosidase estimated by visual observation of intensity of isomaltose and panose spots on thin-layer chromatograms of maltose hydrolyzates:
    0=all transglucosidase removed.
    +=almost all transglucosidase removed.
    ++=easily detectable level of transglucosidase.
    +++=slight removal of transglucosidase.
    ++++=no transglucosidase removed.

Example 4

Twenty milliliter aliquots of an enzyme solution containing 7.4 glucamylase units per milliliter were adjusted to pH 8.15 at 40° C. and 0.5% (0.675 mg./glucamylase unit) of two preparations of bacterial proteases, a fungal protease preparation and a pancreatin preparation were added to various aliquots. The preparations were maintained as indicated for 60 minutes and then adjusted to pH 4.2. Thin layer chromatograms of maltose hydrolyzates showed removal of the transglucosidase in all cases. Evaluation of the ability of the preparations to saccharify liquefied starch (utilizing the procedure of Example 1) was made with the following results.

TABLE 4.—SACCHARIFICATION OF LIQUEFIED STARCH BY ENZYME PREPARATIONS PURIFIED WITH SEVERAL TYPES OF PROTEASE

| Protease treatment: | D.E. at 92 hours |
|---|---|
| None | 91.5 |
| Bacterial protease 1 | 98.6 |
| Bacterial protease 2 | 94.7 |
| Fungal protease | 95.6 |
| Pancreatin | 95.7 |

Example 5

Ten milliliter samples of culture filtrates of *Aspergillus awamori* and *Aspergillus phoenicis* were treated with 0.5% pancreatin. The preparations assayed 1.25 to 2.25 glucamylase units which amounts to 4.0 to 2.2 milligrams of pancreatin per glucamylase unit. They were treated at pH 8.1 and 40° C. for one hour after which they were adjusted to pH 4.2. Thin layer chromatograms of a maltose hydrolyzate showed the treated preparations to be essentially free of transglucosidase.

Example 6

Two liters of a glucamylase solution were adjusted to 40° C. and pH 8.2 and 2.0 grams pancreatin added. The glucamylase solution was prepared by reconstituting a solvent precipitated preparation from an *Aspergillus niger* fermentation. The pH was maintained at 8.1–8.2 and the temperature at 40° C. After 30 minutes a second 2.0 grams of pancreatin were added for a total of 1.025 milligrams pancreatin per unit of glucamylase. At the end of one hour the pH was adjusted to 4.2 and the solution was cooled to room temperature. A thin layer chromatogram of a maltose hydrolyzate showed that the preparation was free of transglucosidase. The recovery of glucamylase amounted to 56%. Evaluation of the ability of the preparation to saccharify liquefied starch, utilizing the procedure described in Example 1, was made with the following results (the untreated enzyme evaluated in duplicate runs and the treated enzyme evaluated in triplicate runs):

TABLE 5.—SACCHARIFICATION OF LIQUEFIED STARCH WITH PURIFIED GLUCAMYLASE COMPARED WITH UNTREATED ENZYME

| Enzyme: | D.E. at 69 hours |
| --- | --- |
| Untreated | 88.7 |
| Untreated | 89.5 |
| Pancreatin treated | 98.6 |
| Pancreatin treated | 94.9 |
| Pancreatin treated | 100.0 |

The enzyme preparation then was used to saccharify liquefied starch on a larger scale. About 46 gallons of 15.5° Bé. liquefied starch was treated in the same manner. At the end of 69 hours, the solution assayed 96.4 D.E. which is considerably higher than would be obtained without the removal of the transglucosidase.

Example 7

Treatment of culture filtrates of glucamylase-containing fungal enzyme preparations was carried out at 40° C. and various pH levels as shown below. In all cases, according to tests by the thin layer chromatography technique, transglucosidase had been inactivated in the treated samples.

TABLE 6.—GLUCAMYLASE RECOVERY AFTER TREATMENT WITH PANCREATIN AT VARIOUS pH LEVELS

| pH: | Recovery, percent |
| --- | --- |
| 7.0 | 83 |
| 7.5 | 89 |
| 8.0 | 82 |
| 8.5 | 82 |

Those modifications and equivalents which fall within the spirit of the invention and the scope of the appended claims are to be considered part of the invention.

We claim:
1. A process of treating a transglucosidase and glucamylase-containing fungal enzyme preparation which comprises treating said preparation with a protease under conditions favorable to protease activity for a time sufficient to achieve substantial inactivation of transglucosidase.

2. The process of claim 1 wherein the treatment is carried out at a pH within the range from about 6 to about 9.

3. The process of claim 1 wherein the treatment is carried out at a temperature from about 20° C. to about 60° C.

4. The process of claim 1 wherein the treatment is carried out at a temperature of from about 35° C. to 40° C.

5. The process of claim 1 wherein the treatment is carried out at a pH from about 7 to 8.

6. The process of claim 1 wherein the transglucosidase and glucamylase-containing fungal enzyme preparation is derived from the Aspergillus genus.

7. The process of claim 1 wherein the protease is an animal protease.

8. The process of claim 1 wherein the protease is a plant protease.

9. The process of claim 1 wherein the protease is a microbial protease.

10. The process according to claim 1 wherein the treatment is carried out at a pH from about 6 to 9 and a temperature from about 20° C. to 60° C. for a period ranging from about 5 minutes up to about 10 hours.

11. The process according to claim 1 wherein the treatment is carried out at a pH from about 6 to 9 and a temperature from about 35° C. to 40° C. for a period of about 1 hour.

12. In a process for producing dextrose from starchy materials wherein the starchy material is hydrolyzed with fungal enzymes, the improvement which consists in hydrolyzing the starchy material with a glucamylase-containing fungal enzyme preparation which has been purified by treatment with a protease under conditions favorable to protease activity for a time sufficient to achieve substantial inactivation of transglucosidase.

13. In a process for producing dextrose from starchy materials wherein the starchy material is hydrolyzed with fungal enzymes, the improvement which consists in hydrolyzing the starchy material with a glucamylase-containing fungal enzyme preparation which has been purified by treatment with a protease at a pH from about 6 to 9 and at a temperature of from 20° C. to 60° C. for a time sufficient to achieve substantial inactivation of transglucosidase.

14. In a process for producing dextrose from starchy materials wherein the starchy material is hydrolyzed with fungal enzymes, the improvement which consists in hydrolyzing the starchy material with a glucamylase-containing fungal enzyme preparation which has been purified by treatment with a protease at a pH of about 6 to 9 and a temperature of from 20° C. to 60° C. for a period ranging from about 5 minutes to about 10 hours.

References Cited by the Examiner

UNITED STATES PATENTS

| 3,108,928 | 10/1963 | Kathrein | 195—31 |
| 3,117,063 | 1/1964 | Hurst et al. | 195—31 |

A. LOUIS MONACELL, *Primary Examiner.*

L. M. SHAPIRO, *Assistant Examiner.*